United States Patent
Endo

(10) Patent No.: US 11,078,110 B2
(45) Date of Patent: Aug. 3, 2021

(54) GLASS WOOL, AND VACUUM HEAT INSULATION MATERIAL USING SAME

(71) Applicant: SAINT-GOBAIN ISOVER, Courbevoie (FR)

(72) Inventor: Shinji Endo, Tokyo (JP)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 16/333,352

(22) PCT Filed: Sep. 19, 2017

(86) PCT No.: PCT/JP2017/033777
§ 371 (c)(1),
(2) Date: Mar. 14, 2019

(87) PCT Pub. No.: WO2018/052150
PCT Pub. Date: Mar. 22, 2018

(65) Prior Publication Data
US 2019/0249817 A1    Aug. 15, 2019

(30) Foreign Application Priority Data
Sep. 16, 2016  (JP) .............................. JP2016-182074

(51) Int. Cl.
| | |
|---|---|
| *C03C 13/06* | (2006.01) |
| *C03C 13/00* | (2006.01) |
| *F16L 59/02* | (2006.01) |
| *F16L 59/065* | (2006.01) |
| *B32B 3/04* | (2006.01) |
| *B32B 5/02* | (2006.01) |
| *C03B 37/04* | (2006.01) |

(52) U.S. Cl.
CPC ................ *C03C 13/06* (2013.01); *B32B 3/04* (2013.01); *B32B 5/022* (2013.01); *C03B 37/04* (2013.01); *C03C 13/00* (2013.01); *F16L 59/02* (2013.01); *F16L 59/028* (2013.01); *F16L 59/065* (2013.01); *B32B 2262/101* (2013.01); *B32B 2307/304* (2013.01); *C03C 2213/00* (2013.01)

(58) Field of Classification Search
CPC ................................ C03C 13/00; C03C 13/06
See application file for complete search history.

(56) References Cited

U.S. PATENT DOCUMENTS

| | | | |
|---|---|---|---|
| 4,312,952 A * | 1/1982 | Carbol .................... | C03C 13/00 501/36 |
| 5,108,957 A * | 4/1992 | Cohen .................... | C03C 3/097 501/35 |
| 5,952,254 A * | 9/1999 | De Meringo ........... | C03C 13/00 428/374 |
| 2012/0186833 A1 | 7/2012 | Wlodarczyk et al. | |
| 2012/0277086 A1 | 11/2012 | Evans et al. | |

FOREIGN PATENT DOCUMENTS

| | | |
|---|---|---|
| CN | 103058526 A | 4/2013 |
| EP | 0 019 600 A2 | 11/1980 |
| JP | S56-14450 A | 2/1981 |
| JP | H08-502717 A | 3/1996 |
| JP | 2005-344871 A | 12/2005 |
| JP | 2008-507634 A | 3/2008 |
| JP | 2008-286263 A | 11/2008 |

OTHER PUBLICATIONS

Danish Ministry of the Enviroment, Evaluation of health hazards by exposure to Mineral wools (glass, stone/slag,HT) and proposal of a health-based quality criterion for ambient air, The Danish Environmental Protection Agency, 2013, pp. 1-13. (Year: 2013).*
International Search Report as issued in International Patent Application No. PCT/JP2017/033777, dated Dec. 19, 2017.

* cited by examiner

*Primary Examiner* — Elizabeth A. Bolden
(74) *Attorney, Agent, or Firm* — Pillsbury Winthrop Shaw Pittman LLP

(57) ABSTRACT

A glass wool which has physical properties required for a heat insulation material, can be produced industrially, can have reduced hygroscopicity, and has a novel compounding composition. The glass wool having the following glass composition: $SiO_2$: 60.0 to 65.0% by mass inclusive, $Al_2O_3$: 0.5 to 2.0% by mass inclusive, $Na_2O$ and $K_2O$: 13.0 to 17.0% by mass inclusive, MgO and CaO: 8.0 to 12.0% by mass inclusive, $B_2O_3$: 5.0 to 12.0% by mass inclusive, and others: a remainder.

10 Claims, 2 Drawing Sheets

GLASS WOOL, AND VACUUM HEAT INSULATION MATERIAL USING SAME

CROSS REFERENCE TO RELATED APPLICATIONS

This application is the U.S. National Stage of PCT/JP2017/033777, filed Sep. 19, 2017, which in turn claims priority to Japanese Patent Application No. 2016-182074 filed Sep. 16, 2016, the entire contents of all applications are incorporated herein by reference in their entireties.

TECHNICAL FIELD

The present invention relates to a glass wool and a vacuum insulation material using the same. More particularly, the present invention relates to a glass wool having low moisture absorption and a vacuum insulation material using the same.

BACKGROUND ART

Glass wool is widely used as an insulation material, sound insulation material and/or sound absorption material in numerous fields for the purpose of retaining heat, retaining cold, insulating from heat or soundproofing and the like as a result of having properties such as lightweight properties, thermal insulating properties, sound insulating properties or sound absorbing properties. In addition, vacuum insulation materials are also known that are obtained by sealing a glass wool core material with an envelope and reducing the pressure inside.

Although various studies have been previously conducted on the glass composition of glass wool, a glass composition is typically used that is referred to as "C-glass", having a high content of alkaline metal.

However, since glass wool is produced using crushed waste glass referred to as "cullet" as raw material, the glass composition of glass wool is greatly influenced by the type and amount of cullet used as raw material. Since there are limitations on the types of cullet that can be used on an industrial scale, glass compositions able to be used as the glass composition of glass wool are limited to a certain range.

In addition, since it is also necessary to take into consideration such factors as the chemical durability, thermal conductivity, mechanical strength, glass melting temperature, viscosity or liquidus temperature of the glass wool based requirements in terms of physical properties of a thermal insulation material as well as requirements in terms of production, selection of the contents of each constituent component of a glass composition is subjected to considerable limitations.

For example, Patent Documents 1 and 2 disclose glass compositions of glass wool that satisfy requirements in terms of physical properties of a heat insulation material as well as requirements in terms of production.

PRIOR ART DOCUMENTS

Patent Documents

[Patent Document 1] Japanese Unexamined Patent Publication No. 2005-344871
[Patent Document 2] Japanese Unexamined Patent Publication No. 2008-286263

DISCLOSURE OF THE INVENTION

Problems to be Solved by the Invention

Thermal insulating properties of glass wool thermal insulation materials are known to be adversely affected due to the presence of moisture, and countermeasures are implemented for allowing this moisture to escape by providing ventilation and the like. In addition, thermal insulating properties of vacuum insulation materials are also known to be adversely affected due to the effects of moisture that enters from the edges of the envelope, and a desiccant is typically sealed inside to adsorb that moisture.

Although glass wool demonstrates a decrease in thermal insulating properties due to the effects of moisture, the moisture absorption of glass wool per se has been virtually ignored. Even if the moisture absorption of glass wool per se had been considered, this only focused on the filament diameter and/or the type of binder of the glass wool that have a direct effect on adsorption surface area.

However, during the course of examining variations in physical properties during the production of glass wool, the inventors of the present invention found that the glass composition of glass wool is more significantly affected by moisture absorption than by such factors as filament diameter.

Therefore, an object of the present invention is to provide a glass wool that has physical properties required for use as a thermal insulation material, can be produced industrially, and is capable of lowering moisture absorption, and a vacuum insulation material using that glass wool.

Means for Solving the Problems

As a result of conducting extensive studies, the inventors of the present invention found that the aforementioned problems can be solved by the means indicated below. Namely, the present invention is as indicated below.

<Aspect 1>
Glass wool having the following glass composition:
$SiO_2$: 60.0 wt % to 65.0 wt %,
$Al_2O_3$: 0.5 wt % to 2.0 wt %,
$Na_2O$ and $K_2O$: 13.0 wt % to 17.0 wt %,
MgO and CaO: 8.0 wt % to 12.0 wt %,
$B_2O_3$: 5.0 wt % to 12.0 wt %, and
other components: balance.

<Aspect 2>
The glass wool described in Aspect 1 having the following glass composition:
$Na_2O$ and $K_2O$: 14.0 wt % to 16.5 wt %,
MgO and CaO: 9.0 wt % to 11.5 wt %, and
$B_2O_3$: 5.0 wt % to 8.0 wt %.

<Aspect 3>
The glass wool described in Aspect 1 having the following glass composition:
$SiO_2$: 62.0 wt % to 64.0 wt %
$Al_2O_3$: 1.2 wt % to 1.8 wt %,
$Na_2O$: 14.0 wt % to 16.0 wt %,
$K_2O$: 0.5 wt % to 2.0 wt %,
MgO: 2.0 wt % to 4.0 wt %,
CaO: 6.0 wt % to 8.0 wt %, and
$B_2O_3$: 6.0 wt % to 8.0 wt %.

<Aspect 4>
The glass wool described in any of Aspects 1 to 3, wherein the mean filament diameter is 0.5 μm or more to 20 μm or less.

<Aspect 5>

The glass wool described in any of Aspects 1 to 4, which does not contain a resin binder.

<Aspect 6>

The glass wool described in any of Aspects 1 to 5, which is a sheet-like compact.

<Aspect 7>

The glass wool described in any of Aspects 1 to 5, wherein equilibrium moisture content on day 7 in the case of having measured in compliance with the chamber method defined in JIS A 1475 is 1.0 wt % or less.

<Aspect 8>

A vacuum insulation material comprising the glass wool described in any of Aspects 1 to 7 and an envelope that encloses the glass wool.

<Aspect 9>

A method for producing the glass wool described in any of Aspects 1 to 7, comprising:
  obtaining a glass melt by melting glass raw materials comprising cullet and an additive for adjusting glass composition, and
  forming the glass melt into filaments.

Effects of the Invention

According to the present invention, a glass wool that has physical properties required for use as a thermal insulating material, can be produced industrially, and is capable of lowering moisture absorption, and a vacuum insulation material that uses that glass wool, can be provided.

MODE FOR CARRYING OUT THE INVENTION

<<Glass Wool>>

Figure 1:
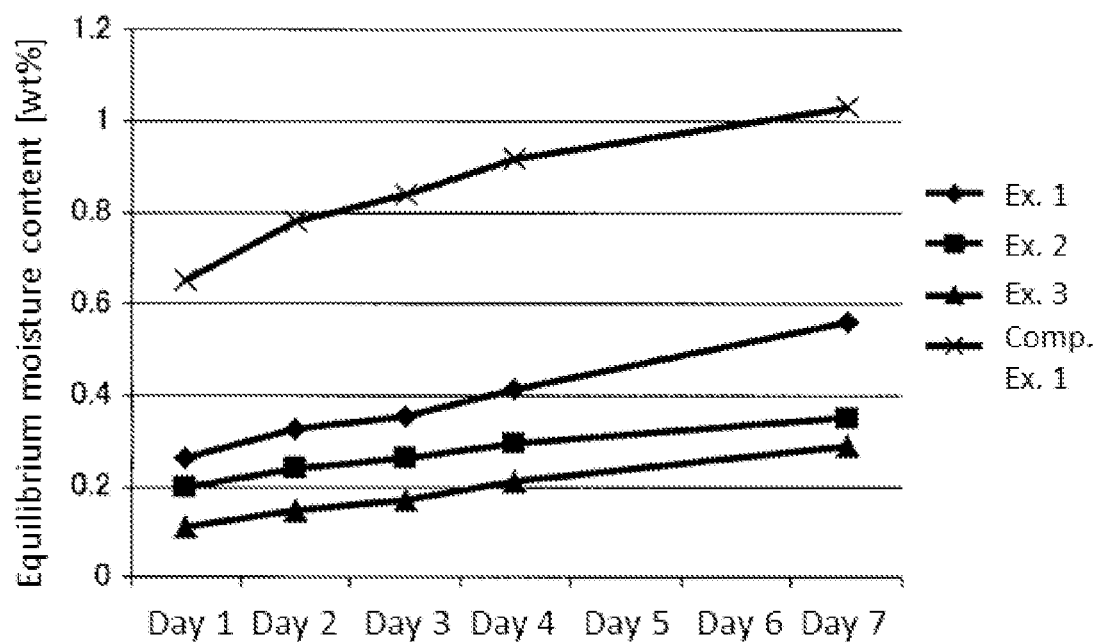
FIG. 1 shows time-based changes in the equilibrium moisture contents of various samples examined in examples.

The glass wool of the present invention has the composition indicated below:
  $SiO_2$: 60.0 wt % to 65.0 wt %,
  $Al_2O_3$: 0.5 wt % to 2.0 wt %,
  $Na_2O$ and $K_2O$: 13.0 wt % to 17.0 wt %,
  MgO and CaO: 8.0 wt % to 12.0 wt %,
  $B_2O_3$: 5.0 wt % to 12.0 wt %, and
  other components: balance.

The inventors of the present invention found that $Na_2O$ and $K_2O$ content as well as $B_2O_3$ content have a considerable effect on the moisture absorption of glass wool per se during the course of examining variations in physical properties during the production of glass wool. More specifically, the inventors of the present invention found that the moisture absorption of glass wool decreases considerably in the case of a low content of $Na_2O$ and $K_2O$ and a high content of $B_2O_3$.

Although not bound by theory, this decrease in moisture absorption is thought to be due to the following reason. In the case of $Na_2O$, for example, —Si—O—Si— bonds are cleaved by forming two Si—ONa moieties from a single —Si—O—Si— moiety. Since these Si—ONa moieties readily react with hydronium ions ($H_3O^+$) present in water, a hydration reaction occurs in the form of Si—ONa+$H_3O^+$→Si—O—H+Na+$H_2O$, and a hydration reaction layer forms on the surface of the glass. In addition, silanol (Si—O—H) groups formed are also known to adsorb water. In this manner, $Na_2O$ is thought to have an effect on the moisture adsorption of glass. Moreover, $B_2O_3$ enters into the glass structure as a result of $B^{3+}$ bonding with oxygen in the form of a tetra-coordinated structure, and since this structure is in the form of a tetrahedron, it does not readily react with water. In addition, it is further thought to be due to a reduction in the non-bridging oxygen of Si as a result of bonding with $Na^+$, thereby causing a reduction in the number of moisture adsorption sites. The same can be assumed to occur with respect to $K_2O$ as well.

Thus, in the present invention, the content of $Na_2O$ and $K_2O$ are made to be comparatively low while the content of $B_2O_3$ is made to be comparatively high in order to lower moisture absorption. Here, although a decrease in the amounts of $Na_2O$ and $K_2O$ causes a rise in the melting temperature while also resulting in an increase in glass viscosity, thereby making production difficult, if the $B_2O_3$ content of the glass is comparatively high, glass viscosity can be lowered together with lowering the melting temperature. On the other hand, since phase separation tends to occur when the content of $B_2O_3$ increases, it is necessary to place an upper limit on the content of $B_2O_3$ as well. Thus, in the present invention, the total content of MgO and CaO is made to be comparatively high in order to further lower viscosity. However, since devitrification tends to occur when the contents of CaO and MgO become comparatively high, these tendencies can be inhibited and suitable elasticity and chemical durability are obtained by using the contents of $SiO_2$ and $Al_2O_3$ within specific ranges.

The inventors of the present invention found that a glass composition having the combination of components indicated above is able to simultaneously satisfy requirements for those physical properties required for use as a glass wool thermal insulating material and the industrial production thereof, such as reduced moisture absorption, prevention of devitrification, prevention of phase separation, industrial production using cullet, suitable viscosity, elasticity or chemical durability.

The following respectively provides explanations of each of the components and physical properties of the glass composition of the glass wool of the present invention.

<$SiO_2$>

The content of $SiO_2$ in the glass composition of the glass wool of the present invention is 60.0 wt % to 65.0 wt %. In the case the $SiO_2$ content of the glass wool is within this range, the viscosity and melting temperature of the glass can be made to be within suitable ranges, vitrification can be facilitated, the glass is resistant to devitrification, and suitable elasticity can be imparted to the glass wool. In addition, an $SiO_2$ content within this range facilitates production from cullet.

The $SiO_2$ content may be 60.0 wt % or more, 60.5 wt % or more, 61.0 wt % or more, 61.5 wt % or more, 62.0 wt % or more, 62.5 wt % or more or 63.0 wt % or more, and 65.0 wt % or less, 64.5 wt % or less, 64.0 wt % or less, 63.5 wt % or less or 63.0 wt % or less.

<$Al_2O_3$>

The content of $Al_2O_3$ in the glass composition of the glass wool of the present invention is 0.5 wt % to 2.0 wt %. In the case the $Al_2O_3$ content of the glass wool is within this range, the viscosity and melting temperature of the glass can be made to be within suitable ranges, the glass is resistant to devitrification, and suitable elasticity, water resistance and chemical durability can be imparted to the glass wool. In addition, an $Al_2O_3$ content within this range facilitates production from cullet.

The $Al_2O_3$ content may be 0.5 wt % or more, 0.8 wt % or more, 1.0 wt % or more, 1.2 wt % or more, 1.4 wt % or more or 1.5 wt % or more, and 2.0 wt % or less, 1.8 wt % or less, 1.6 wt % or less, 1.4 wt % or less, 1.2 wt % or less or 1.0 wt % or less.

<$Na_2O$ and $K_2O$>

The total content of $Na_2O$ and $K_2O$ in the glass composition of the glass wool of the present invention is 13.0 wt % to 17.0 wt %. By making the total amount of $Na_2O$ and $K_2O$ to be comparatively small in this manner after having made other constituent components to be within the aforementioned ranges, the amount of moisture adsorbed by the glass wool of the present invention can be lowered, the viscosity and melting temperature of the glass can be made to be within suitable ranges and requirements in terms of having physical properties of a thermal insulation material and requirements in terms of production can be satisfied. In addition, if the total content of $Na_2O$ and $K_2O$ is within this range, there is the advantage of being resistant to decreases in strength.

The total content of $Na_2O$ and $K_2O$ may be 13.0 wt % or more, 13.5 wt % or more, 14.0 wt % or more, 14.5 wt % or more, 15.0 wt % or more, 15.5 wt % or more or 16.0 wt % or more, and 17.0 wt % or less, 16.5 wt % or less or 16.0 wt % or less.

$Na_2O$ and $K_2O$ are preferably used in combination, and chemical durability of the glass wool can be improved based on a mixed alkali effect as a result thereof. On the other hand, since there is increased susceptibility to erosion of furnace materials, melting tends to be difficult, and the glass is susceptible to phase separation if the content of $K_2O$ is excessively high, $Na_2O$ is preferably used in a comparatively large amount in comparison with $K_2O$. The ratio of the contents of $Na_2O$ and $K_2O$ ($Na_2O/K_2O$) may be 2.0 or more, 3.0 or more, 5.0 or more, 8.0 or more, 10.0 or more, 12.0 or more, 15.0 or more, 17.0 or more or 20.0 or more, and 50.0 or less, 40.0 or less, 30.0 or less, 25.0 or less, 22.0 or less, 20.0 or less, 17.0 or less or 15.0 or less. A ratio of $Na_2O/K_2O$ of 15.0 to 25.0 is particularly advantageous in the case of producing the glass wool using cullet.

The content of $Na_2O$ may be 13.5 wt % or more, 13.0 wt % or more, 14.0 wt % or more, 14.5 wt % or more, 15.0 wt % or more or 15.5 wt % or more, and 17.0 wt % or less, 16.5 wt % or less, 16.0 wt % or less, 15.5 wt % or less or 15.0 wt % or less.

In addition, the content of $K_2O$ may be 0.3 wt % or more, 0.5 wt % or more, 0.8 wt % or more, 1.0 wt % or more, 1.5 wt % or more or 2.0 wt % or more, and 3.0 wt % or less, 2.5 wt % or less, 2.0 wt % or less, 1.5 wt % or less, 1.0 wt % or less or 0.5 wt % or less.

<MgO and CaO>

The total content of MgO and CaO in the glass composition of the glass wool of the present invention is 8.0 wt % to 12.0 wt %. By making the total content of MgO and CaO to be such an amount after having made other constituent components to be within the aforementioned ranges, the glass viscosity of the glass wool of the present invention can be lowered and the potential for devitrification can be reduced. In addition, if the total content of MgO and CaO is within this range, there is the advantage of being resistant to decreases in strength.

The total content of MgO and CaO may be 8.0 wt % or more, 8.5 wt % or more, 9.0 wt % or more, 9.5 wt % or more, 10.0 wt % or more, 10.5 wt % or more or 11.0 wt % or more, and 12.0 wt % or less, 11.5 wt % or less, 11.0 wt % or less, 10.5 wt % or less or 10.0 wt % or less.

MgO and CaO are preferably used in combination, so that devitrification can be inhibited and changes in viscosity at high temperatures can be decreased as a result thereof. Namely, since devitrification tends to occur if the content of CaO is excessively high, the tendency to undergo devitrification can be inhibited by substituting CaO with MgO. In addition, changes in viscosity at high temperatures can be decreased as a result thereof. The ratio of the contents of MgO and CaO (MgO/CaO) may be 0.1 or more, 0.2 or more, 0.4 or more, 0.5 or more or 1.0 or more, and 5.0 or less, 3.0 or less, 2.0 or less, 1.5 or less, 1.0 or less, 0.8 or less, 0.5 or less or 0.3 or less. A ratio of MgO/CaO of 0.2 to 0.8 is particularly advantageous in the case of producing the glass wool using cullet.

The content of MgO may be 1.0 wt % or more, 1.5 wt % or more, 2.0 wt % or more, 2.5 wt % or more, 3.0 wt % or more, 3.5 wt % or more or 4.0 wt % or more, and 5.0 wt % or less, 4.5 wt % or less, 4.0 wt % or less, 3.5 wt % or less 3.0 wt % or less, 2.5 wt % or less, 2.0 wt % or less or 1.5 wt % or less.

In addition, the content of CaO may be 5.0 wt % or more, 5.5 wt % or more, 6.0 wt % or more, 6.5 wt % or more, 7.0 wt % or more, 7.5 wt % or more, 8.0 wt % or more or 8.5 wt % or more, and 11.0 wt % or less, 10.5 wt % or less, 10.0 wt % or less, 9.5 wt % or less, 9.0 wt % or less, 8.5 wt % or less, 8.0 wt % or less, 7.5 wt % or less or 7.0 wt % or less.

<$B_2O_3$>

The content of $B_2O_3$ in the glass composition of the glass wool of the present invention is 5.0 wt % to 12.0 wt %. By using $B_2O_3$ in a comparatively large amount in this manner after having made other constituent components to be within the aforementioned ranges, the glass wool of the present invention can be made to have suitable viscosity and melting temperature, and requirements in terms of having physical properties of a thermal insulation material and requirements in terms of production can be satisfied. In addition, if the content of $B_2O_3$ is within this range, moisture absorption of the resulting glass wool is low, thereby offering the advantage of high thermal insulating properties.

The content of $B_2O_3$ may be 5.0 wt % or more, 5.5 wt % or more, 6.0 wt % or more, 6.5 wt % or more, 7.0 wt % or more, 7.5 wt % or more or 8.0 wt % or more, and 12.0 wt % or less, 11.5 wt % or less, 11.0 wt % or less, 10.5 wt % or less, 10.0 wt % or less, 9.5 wt % or less, 9.0 wt % or less, 8.5 wt % or less or 8.0 wt % or less.

<Other Constituent Components>

The glass composition of the glass wool of the present invention may contain other constituent components within a range that satisfies requirements in terms of having physical properties of a thermal insulation material and requirements in terms of production, and examples of other constituent components that may be contained include $S_2O_3$, $Fe_2O_3$, MnO, BaO, $TiO_2$, SrO, PbO, $Cr_2O_3$, ZnO, $Rb_2O$ and $Cs_2O$.

These other constituent components may be contained in total at 10.0 wt % or less, 8.0 wt % or less, 6.0 wt % or less, 4.0 wt % or less, 3.5 wt % or less, 3.0 wt % or less, 2.5 wt % or less, 2.0 wt % or less, 1.5 wt % or less, 1.0 wt % or less or 0.5 wt % or less.

<Equilibrium Moisture Content>

The equilibrium moisture content on day 7 of the glass wool of the present invention in the case of having measured according to the method described in the examples may be 1.0 wt % or less, 0.80 wt % or less, 0.60 wt % or less, 0.50 wt % or less, 0.40 wt % or less or 0.30 wt % or less.

<Mean Filament Diameter>

The mean filament diameter of the glass wool of the present invention may be, for example, 1.0 µm or more, 2.0 µm or more or 3.0 µm or more and 20 µm or less, 10 µm or less, 8 µm or less or 5 µm or less. The glass filament diameter referred to here can be measured by observing 200 or more filaments of the glass wool with a microscope, such as by placing a small amount of glass wool between two glass slides and observing 200 or more filaments with the VHX-200 Digital Microscope manufactured by Keyence Corp.

<Area Weight>

The area weight of the glass wool of the present invention may be, for example, 1000 g/m² or more, 1200 g/m² or more, 1500 g/m² or more, 1800 g/m² or more or 2000 g/m² or more, and 4000 g/m² or less, 3500 g/m² or less, 3000 g/m² or less or 2500 g/m² or less.

<Density>

The density of the glass wool of the present invention may be, for example, 50 kg/m³ or more, 80 kg/m³ or more, 100 kg/m³ or more or 150 kg/m³ or more, and 350 kg/m³ or less, 300 kg/m³ or less, 250 kg/m³ or less or 200 kg/m³ or less.

<Form and Layer Configuration>

The glass wool of the present invention may be in the form of a sheet-like compact such as a glass wool compact like that obtained according to the method described in the specification of Japanese Patent No. 3712129. In addition, in the case the glass wool of the present invention is in the form of a sheet-like compact, the glass wool of the present invention may be a single layer or may be two or three or more laminated layers.

<Binder>

The glass wool of the present invention may have a resin binder such as a phenolic resin binder. In addition, it may also substantially not have a resin binder. For example, the glass wool of the present invention may be in the form of a three-dimensional framework structure in which the intersecting portions of the filaments are joined with an inorganic binder such as water glass like that obtained according to the method described in the specification of Japanese Patent No. 3712129.

<<Vacuum Insulation Material>>

The vacuum insulation material of the present invention comprises the aforementioned glass wool and an envelope that encloses the glass wool. Normally, the envelope comprises a heat sealable layer, barrier layer and protective layer, sealing portions are formed on the ends thereof by mutually heat-sealing opposing heat sealable layers, and the glass wool is enclosed in the envelope in the form of a core material. Each layer can be adhered together with a layer of adhesive. In addition, an adsorbent or hygroscopic agent and the like can also be contained between and/or within each layer.

The thickness of the envelope may be 10 µm or more, 20 µm or more, 30 µm or more or 40 µm or more, and 100 µm or less, 80 µm or less or 60 µm or less.

The vacuum insulation material of the present invention can be used to thermally insulate, for example, floor heating systems, vending machines, modular bathrooms, bathtubs and their covers, thermos flasks, refrigerators, refrigerated storage rooms, refrigerated vehicles, cool boxes, automobiles, building (such as residential) rooves, building walls, building ceilings, building floors or hot water tanks.

<<Glass Wool Production Method>>

The glass wool production method of the present invention comprises obtaining a glass melt by melting glass raw materials comprising cullet and an additive, and forming the glass melt into filaments.

Commercially available recycled cullet such as empty bottles, automotive glass, screen boards, cathode ray tubes, liquid crystal panels, displays, mirrors or plate glass can be used for the cullet. This type of cullet normally has a glass composition like that indicated below.

$SiO_2$: 65.0 wt % to 75.0 wt %
$Al_2O_3$: 1.0 wt % to 5.0 wt %
$Na_2O$: 10.0 wt % to 15.0 wt %
$K_2O$: 0.5 wt % to 3.0 wt %
MgO: 0.1 wt % to 5.0 wt %
CaO: 7.0 wt % to 13.0 wt %
$B_2O_3$: 0.3 wt % or less
Other components: balance In addition, the cullet may have a glass composition like that indicated below in particular.

$SiO_2$: 69.0 wt % to 72.0 wt %
$Al_2O_3$: 1.5 wt % to 3.5 wt %
$Na_2O$: 12.0 wt % to 14.0 wt %
$K_2O$: 0.8 wt % to 1.5 wt %
MgO: 0.2 wt % to 4.0 wt %
CaO: 7.5 wt % to 12.0 wt %
$B_2O_3$: 0.2 wt % or less
Other components: balance Cullet derived from empty bottles in particular may have an MgO content of 0.2 wt % to 1.0 wt % and CaO content of 9.5 wt % to 12.0 wt %. In addition, cullet derived from automotive glass may have an MgO content of 2.5 wt % to 4.5 wt % and CaO content of 7.5 wt % to 9.5 wt %.

In the present invention, one type of the aforementioned cullet can be used alone or a plurality of types can be used in combination. The method of the present invention comprises obtaining a glass melt by melting glass raw materials consisting of this cullet and an additive for adjusting glass composition, such as silica sand, feldspar, kaolin, potassium feldspar, sodium feldspar, soda ash, dolomite, magnesite, talc, boric acid, borax, sodium sulfate (mirabilite), manganese dioxide, sodium nitrate, colemanite, lazurite, calcined alumina, anorthite, nepheline syenite, lepidolite, petalite, spodumene, blast furnace slag, potassium carbonate, potassium nitrate, calcium carbonate, magnesia lime, aluminum hydroxide, magnesium hydroxide, calcium carbonate, saltpeter, fluorite, red lead, limestone or quicklime, followed by forming this glass melt into filaments. The aforementioned glass wool of the present invention can be easily obtained using glass raw materials substantially consisting of cullet and borax, or using glass raw materials substantially consisting of cullet, soda ash and borax.

Melting of the glass raw materials and formation of the glass melt into filaments can be carried out according to known methods described in, for example, Japanese Unexamined Patent Publication No. 2009-155172.

EXAMPLES

Glass raw materials comprising 5 parts by weight to 20 parts by weight of borax and 0 parts by weight to 5 parts by weight of soda ash to 100 parts by weight of cullet having the composition shown in Table 1 were melted to obtain a glass melt, followed by forming the glass melt into filaments using a spinner to obtain the glass wool of Example 1 having a mean filament diameter of about 4 µm and the composition shown in Table 1.

Glass wools of Examples 2 and 3 and Comparative Example 1 shown in Table 2 were obtained in the same manner as Example 1 with the exception of changing the mixing ratio of cullet, borax and soda ash.

TABLE 1

|  | Cullet | Ex. 1 | Ex. 2 | Ex. 3 | Comp. Ex. 1 |
|---|---|---|---|---|---|
| $SiO_2$ | 68.2 to 70.6 | 63.1 | 63.0 | 63.0 | 63.9 |
| $Al_2O_3$ | 1.3 to 2.0 | 1.3 | 1.4 | 1.4 | 1.5 |
| $Na_2O$ | 12.2 to 13.6 | 15.7 | 15.1 | 15.1 | 17.0 |
| $K_2O$ | 0.7 to 1.4 | 0.7 | 0.9 | 0.9 | 0.9 |
| $Na_2O + K_2O$ | — | 16.5 | 15.9 | 16.0 | 17.9 |
| $Na_2O/K_2O$ | — | 21.5 | 17.7 | 17.4 | 18.9 |
| MgO | 3.3 to 3.9 | 3.1 | 3.2 | 3.2 | 3.2 |
| CaO | 8.1 to 9.0 | 7.8 | 7.7 | 7.6 | 7.7 |
| MgO + CaO | — | 10.9 | 10.8 | 10.7 | 11.0 |
| MgO/CaO | — | 0.40 | 0.41 | 0.42 | 0.42 |
| $B_2O_3$ | 0 | 6.1 | 7.4 | 7.9 | 4.0 |
| Other | 1.5 to 3.8 | 2.1 | 1.6 | 1.1 | 1.7 |

The equilibrium moisture contents of these glass wools were measured in compliance with the chamber method defined in JIS A 1475. More specifically, each type of glass wool core material was cut into squares measuring 50 mm to 60 mm on a side to a weight of 10 g followed by measurement of their length, width and thickness, confirming that the density was the same for each type, and using these pieces as samples. After measuring the weights of the samples prior to drying, the samples were placed in a drying oven in an environment at 105° C. and dried. Here, the weight of each sample was measured every 24 hours and the samples were dried until the difference between consecutively measured weights was within 0.1%. Next, the samples were transferred to a constant-temperature, constant-humidity chamber in an environment having a temperature of 23° C. and humidity of 93% followed by measuring the weights of the core material samples every 24 hours.

Figure 2:
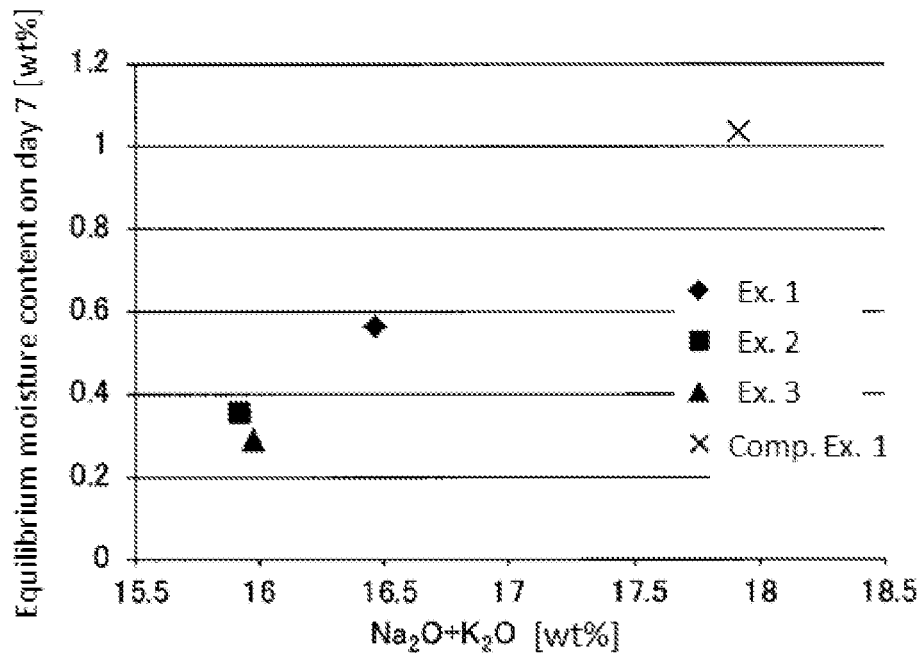
FIG. 2 indicates a graph of equilibrium moisture content on day 7 versus $Na_2O$ and $K_2O$ content of various samples examined in examples.
Figure 3:
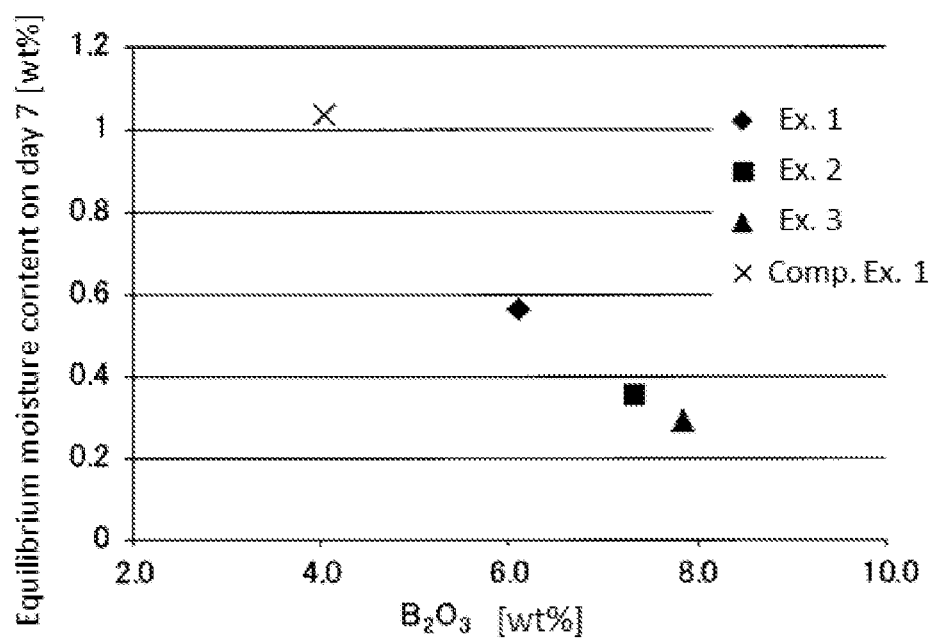
FIG. 3 indicates a graph of equilibrium moisture content on day 7 versus $B_2O_3$ content of various samples examined in examples.

Time-based changes in equilibrium moisture content are shown in FIG. 1. In addition, graphs of equilibrium moisture content on day 7 versus total $Na_2O+K_2O$ content and equilibrium moisture content on day 7 versus $B_2O_3$ content are shown in FIGS. 2 and 3, respectively.

It can be understood from FIG. 1 that moisture absorption is low in the case of a comparatively low content of $Na_2O+K_2O$ and a comparatively high content of $B_2O_3$ (Examples 1 to 3). In addition, it can be understood from FIG. 2 that there is a high correlation between the total amount of $Na_2O+K_2O$ and moisture absorption. Moreover, it can be understood from FIG. 3 that there is also a high correlation between the amount of $B_2O_3$ and moisture absorption.

The invention claimed is:

1. Glass wool having the following glass composition consisting of:
   $SiO_2$: 60.0 wt % to 65.0 wt %,
   $Al_2O_3$: more than 1.0 wt % to 2.0 wt %,
   $Na_2O$ and $K_2O$: 13.0 wt % to 17.0 wt %,
   MgO and CaO: 8.0 wt % to 12.0 wt %,
   $B_2O_3$: 5.0 wt % to 12.0 wt %, and
   one or more other components: balance,
   wherein the one or more other components are selected from the group consisting of $S_2O_3$, $Fe_2O_3$, MnO, BaO, $TiO_2$, SrO, PbO, $Cr_2O_3$, ZnO, $Rb_2O$ and $Cs_2O$.

2. The glass wool according to claim 1, wherein the glass composition has
   $Al_2O_3$: 1.2 wt % to 2.0 wt %.

3. The glass wool according to claim 1 having the following glass composition:
   $Na_2O$ and $K_2O$: 13.0 wt % to 16.5 wt %,
   MgO and CaO: 9.0 wt % to 11.5 wt %, and
   $B_2O_3$: 5.0 wt % to 8.0 wt %.

4. The glass wool according to claim 1 having the following glass composition:
   $SiO_2$: 62.0 wt % to 64.0 wt %
   $Al_2O_3$: 1.2 wt % to 1.8 wt %,
   $Na_2O$: 14.0 wt % to 16.0 wt %,
   $K_2O$: 0.5 wt % to 2.0 wt %,
   MgO: 2.0 wt % to 4.0 wt %,
   CaO: 6.0 wt % to 8.0 wt %, and
   $B_2O_3$: 6.0 wt % to 8.0 wt %.

5. The glass wool according to claim 1, wherein equilibrium moisture content on day 7 in the case of having measured in compliance with the chamber method defined in JIS A 1475 is 1.0 wt % or less.

6. The glass wool according to claim 1, wherein a mean filament diameter is 0.5 μm or more to 20 μm or less.

7. The glass wool according to claim 1, which does not contain a resin binder.

8. The glass wool according to claim 1, which is a sheet-like compact.

9. A vacuum insulation material comprising the glass wool according to claim 1 and an envelope that encloses the glass wool.

10. A method for producing the glass wool according to claim 1, comprising:
   obtaining a glass melt by melting glass raw materials comprising cullet and an additive for adjusting glass composition, and
   forming the glass melt into filaments.

\* \* \* \* \*